United States Patent
Chen

[19]

[11] Patent Number: 6,070,615

[45] Date of Patent: Jun. 6, 2000

[54] LEAKPROOF AND FIREPROOF TUBING

[75] Inventor: Chun-Chen Chen, Taipei, Taiwan

[73] Assignee: United Microelectronics Corp., Hsinchu, Taiwan

[21] Appl. No.: 09/172,313

[22] Filed: Oct. 14, 1998

[30] Foreign Application Priority Data

Jul. 21, 1998 [TW] Taiwan ................................ 87111846

[51] Int. Cl.⁷ .................................................. F16L 53/00
[52] U.S. Cl. ............................ 138/33; 138/104; 138/143; 138/DIG. 3
[58] Field of Search ............................ 138/33, 104, 143, 138/DIG. 3

[56] References Cited

U.S. PATENT DOCUMENTS

| | | | |
|---|---|---|---|
| 2,452,367 | 10/1948 | Gangloff | 138/33 |
| 3,522,413 | 8/1970 | Chrow | 138/33 |
| 3,727,029 | 4/1973 | Chrow | 138/33 |
| 3,766,357 | 10/1973 | Koester, Jr. | 138/33 |
| 4,194,536 | 3/1980 | Stone et al. | 138/33 |
| 4,332,849 | 6/1982 | Barkus et al. | 138/97 |
| 4,429,213 | 1/1984 | Mathieu | 138/137 |
| 4,484,061 | 11/1984 | Zelinka et al. | 138/33 |
| 4,653,541 | 3/1987 | Oehlschlaeger et al. | 138/104 |
| 4,874,925 | 10/1989 | Dickenson | 138/33 |
| 5,381,511 | 1/1995 | Bahar et al. | 138/104 |
| 5,714,738 | 2/1998 | Hauschulz et al. | 138/33 |

*Primary Examiner*—James Hook
*Attorney, Agent, or Firm*—Thomas, Kayden, Horstemeye & Risley

[57] ABSTRACT

A leakproof and fireproof tubing according to the invention comprises an inner tube for guiding a chemical fluid, a heater surrounding the inner tube, a foil enclosing the inner tube which is already surrounded by the heater, and an outer tube surrounding and coaxial with the inner tube. When chemical fluid leakage or a fire caused by a short circuit in the heater is encountered, the tubing can efficiently prevent the chemical fluid leakage and fire from further extending to the outside atmosphere. In coordination with the use of a sensor, the failure of the tubing can be repaired in a timely manner.

10 Claims, 1 Drawing Sheet

LEAKPROOF AND FIREPROOF TUBING

CROSS-REFERENCE TO RELATED APPLICATION

This application claims the priority benefit of Taiwan application serial no. 87111846, filed Jul. 21, 1998.

BACKGROUND OF THE INVENTION

1. Field of the Invention

The invention relates to a leakproof and fireproof tubing, and in particular to a leakproof and fireproof tubing including an inner tube, an outer tube surrounding and coaxial with the inner tube, and a heater and a foil located therebetween.

2. Description of the Related Art

In semiconductor processes, a variety of chemical gases or liquids are commonly used. Therefore, it is necessary to have individual transmission systems for conveying the various chemical gases or liquids. Designs of the various transmission systems depend on the properties of the transmitted chemical gases or liquids.

In general, a gas transmission system is used to transmit a gas from a gas cylinder to processing equipment via a tubing and valves. The gas cylinder is usually positioned in a gas cabinet.

Currently, double coaxial tubes have been adopted to make a tubing used for transmitting corrosive, combustible, toxic and explosive chemical fluids. The double coaxial tubes, serving as a tubing, consist of an inner tube and an outer tube having different diameters, wherein the inner tube is positioned inside the outer tube. The inner tube is mainly used to transmit the above-mentioned dangerous chemical fluids while the outer tube is used to protect the inner tube. However, if the tubing does not have a heater installed, the system is easily congested when transporting a number of easily-congealed chemical fluids.

Another tubing is designed with a heater as shown in FIG. 1. In FIG. 1, a tube 10 is surrounded by a heater 12, and then enclosed by an insulator 14. Due to the large volume of the insulator 14, it is unnecessary to additionally install an outer tube. Even though this design can prevent chemical fluids from congealing, no method is provided to prevent chemical fluid leakage. If the tube 10 or the heater 12 is broken, a chemical fluid leakage and/or fire on the transmission system due to a short circuit on the heater can easily occur.

SUMMARY OF THE INVENTION

In view of the above, an object of the invention is to provide a leakproof and fireproof tubing which can efficiently prevent chemical fluid leakage and a fire.

The leakproof and fireproof tubing according to the invention comprises an inner tube, a heater surrounding the inner tube, a foil enclosing the inner tube which is already surrounded by the heater, and an outer tube surrounding and coaxial with the inner tube. The leakproof and fireproof tube can efficiently prevent chemical fluid leakage and fire which would harm operators, in coordination with the use of a sensor.

Moreover, with the use of the heater, a chemical fluid transmitted by the leakproof and fireproof tubing does not congeal at all. The foil, preferably made of tin foil, enclosing the inner tube which is already surrounded by the heater, can uniformly dissipate heat generated by the heater to the outside of the outer tube. Also, the foil can withstand an instantaneous high temperature when welding the outer tube. If chemical fluid leakage and/or fire is/are caused by the broken inner tube and/or a short circuit in the heater, it/they cannot further extend to the outside atmosphere. In addition the damaged tubing is repaired as soon as the sensor detects the damage.

BRIEF DESCRIPTION OF THE DRAWINGS

The invention will be more fully understood from the detailed description (given hereinbelow and the accompanying drawings., which are given by way of illustration only and thus do not limit the present invention, wherein.

DETAILED DESCRIPTION OF THE INVENTION

Figure 1:
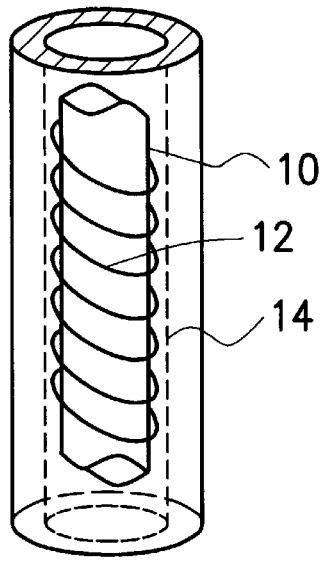
FIG. 1 is a perspective view showing a tubing including a heater according to the prior art.
Figure 2:
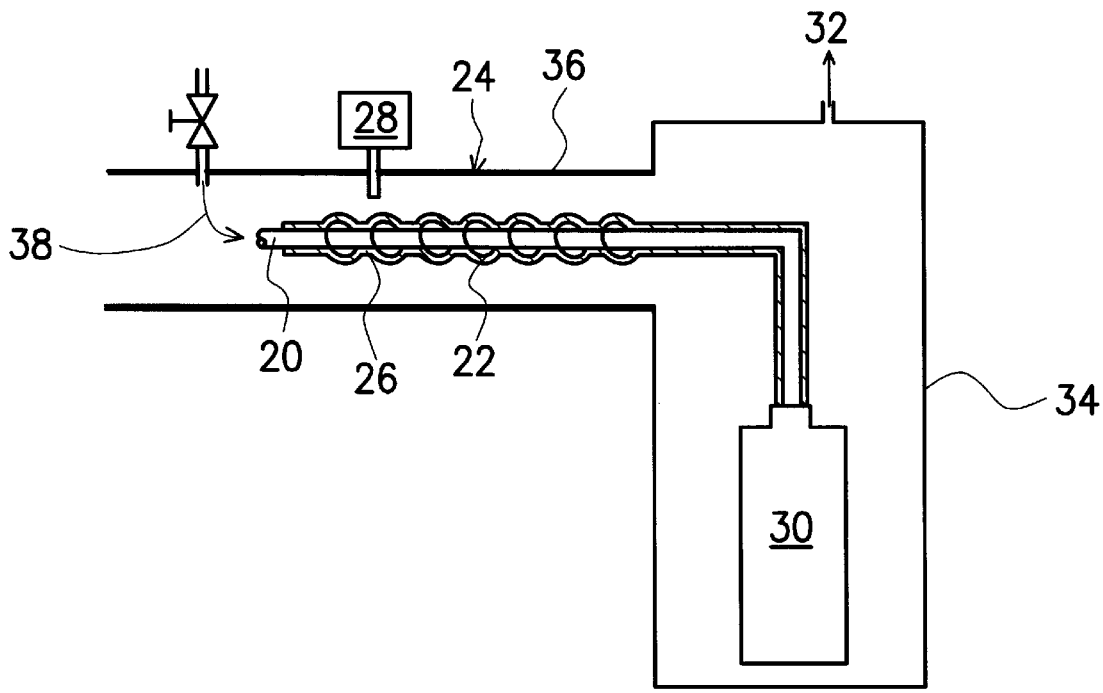
FIG. 2 is a schematic view showing a leakproof and fireproof tubing according to a preferred embodiment of the invention.

FIG. 2 shows a leakproof and fireproof tubing according to a preferred embodiment of the invention. In FIG. 2, a gas cylinder 30 containing a dangerous chemical fluid is fixed inside a gas cabinet 34 with a support (not shown). The dangerous chemical fluid can be corrosive, combustible, toxic and/or explosive. The gas cabinet 34 is used to absolutely isolate the dangerous chemical fluid from the outside and to protect the gas cylinder 30 and a transmission device (not shown). An exhaust port 32 and an emergency sprinkler (not show) are located on the top of the gas cabinet 34. When the chemical fluid in the gas cylinder 30 or the tubing leaks, the chemical fluid that leaks out can be evacuated out via the exhaust port 32.

The chemical fluid required in semiconductor process is conveyed from the gas cylinder 30 via the tubing to the designated processing equipment. An inner tube 20 connected to the gas cylinder 30 is used to guide the chemical fluid. The material used to make the inner tube 20, such as stainless steel, brass or teflon, depends on the transmitted chemical fluid. Furthermore, the inner tube 20 is surrounded by a heater 22 which is used to keep the chemical fluid at a constant temperature, such that the chemical fluid in the inner tube 20 does not congeal to cause congestion in the inner tube. Preventing congestion can prevent the inner tube 20 from breaking due to excessive pressure therein.

Figure 3:
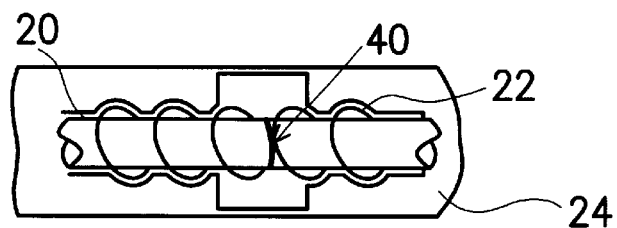
FIG. 3 is a magnified view showing a joint of an inner tube of a leakproof and fireproof tubing according the preferred embodiment of the invention.

Moreover, the inner tube 20 with a surrounding heater 22 is further enclosed by a foil 26, preferably a tin foil, which is used to uniformly dissipate heat created by the heater 22. The part of the foil 26 enclosing the joint of the inner tube 20 is thicker than the other part thereof for protecting the joint. Referring to FIG. 3, the foil 26 is used to protect the heater 22 while welding the outer tube 24. Without the protection of the foil 26, the instantaneous heat due to welding may cause a short circuit which then may cause a fire.

As can be seen from FIG. 2, the inner tube 20 having the heater 22 and the foil 26 thereon is surrounded by and coaxial with the outer tube 24. The outer tube 24 is connected to the gas cabinet 34. In addition, the outer tube 24 is further enclosed by an insulator 36 for insulation. A material, such as stainless steel, brass or teflon, used to make the outer tube 24 depends on the transmitted chemical fluid. A sensor 28, such as a toxic sensor, a gas leakage sensor or a fire sensor, is installed in a closed system between the inner tube 20 and the outer tube 24. Although the sensor 28 (shown in FIG. 2) is installed on the inner surface of the outer tube 24 for sensing whether the chemical fluid is leaking from the inner tube 20 or if a fire is occurring, it can also be installed in the gas cabinet 34.

The sensor 28 can immediately sense transmitted chemical fluid leaks and fires caused by the heater 22, whereupon the heater sounds an alarm. The outer tube 24 is able to isolate the surrounding environment from the dangerous chemical fluid leak. Furthermore, with the protection of the outer tube 24, the failure can be repaired in a timely manner when the heater 22 starts to catch fire.

Since the inner tube 20 surrounded by the heater 22 is further enclosed by the foil 20, the heat created by the heater 22 can be uniformly dissipated to the outside of the outer tube 24. Moreover, the foil 20 is also used to protect the heater 22 from instantaneous high-temperature damage when welding the outer tube 24.

A carrier gas flow, such as a nitrogen flow, existing between the inner tube 20 and the outer tube 24, is used to bring the leaking chemical fluid out via the exhaust port 32 once chemical fluid leakage occurs. Hence, the leaking chemical fluid does not further leak into the outside atmosphere at all.

In short, the features of the invention are as follows:

(1) A leakproof and fireproof tubing of the invention comprises an inner tube, a heater surrounding the inner tube, a foil enclosing the inner tube which is already surrounded by the heater and an outer tube surrounding and coaxial with the inner tube. Accordingly, the leakproof and fireproof tube can efficiently prevent chemical fluid leakage and fire from harming operators, in coordination with the use of a sensor.

(2) The leakproof and fireproof tubing can prevent the transmitted chemical fluid from congealing.

(3) The foil enclosing the inner tube with the heater surrounding the inner tube can uniformly dissipate heat created by the heater to outside. Moreover, the foil can also withstand a sudden high temperature when welding the outer tube.

While the invention has been described by way of example and in terms of the preferred embodiment it is to be understood that the invention is not limited to the disclosed embodiment. To the contrary it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A leakproof and fireproof tubing, comprising:

an inner tube connected to a gas cylinder;

a heater surrounding the inner tube;

a foil enclosing the inner tube which is already surrounded by the heater;

an outer tube surrounding and coaxial with the inner tube;

a sensor installed between the inner tube and the outer tube; and an exhaust port communicating with a closed system between the inner tube and the outer tube.

2. The leakproof and fireproof tubing as claimed in claim 1, wherein the gas cylinder is positioned in a gas cabinet.

3. The leakproof and fireproof tubing as claimed in claim 1, wherein the inner tube is made of stainless steel.

4. The leakproof and fireproof tubing as claimed in claim 1, wherein the inner tube is made of brass.

5. The leakproof and fireproof tubing as claimed in claim 1, wherein the inner tube is made of teflon.

6. The leakproof and fireproof tubing as claimed in claim 1, wherein the foil is a tin foil.

7. The leakproof and fireproof tubing as claimed in claim 1, further comprising an insulator enclosing the outer tube.

8. The leakproof and fireproof tubing as claimed in claim 1, wherein the sensor is selected from a group consisting of a poison gas sensor, a gas leakage sensor and a fire sensor.

9. The leakproof and fireproof tubing as claimed in claim 1, further comprising a carrier gas which flows in the closed system between the inner tube and the outer tube.

10. The leakproof and fireproof tubing as claimed in claim 9, wherein the carrier gas is nitrogen.

\* \* \* \* \*